2,987,656
REMOTE CONTROLLED GEAR SHIFT
Albert Handshuh, 183 Forest Hill Road, West Orange, N.J., and William Malbaurn, 168 Washington St., Bloomfield, N.J.
Filed Mar. 6, 1958, Ser. No. 719,599
2 Claims. (Cl. 317—190)

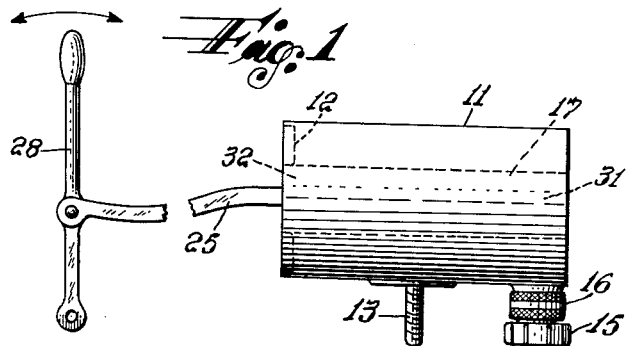
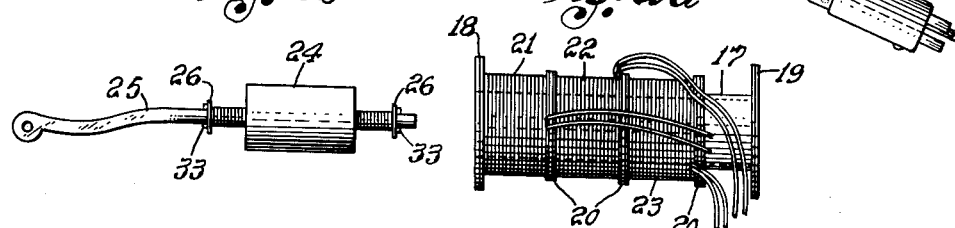
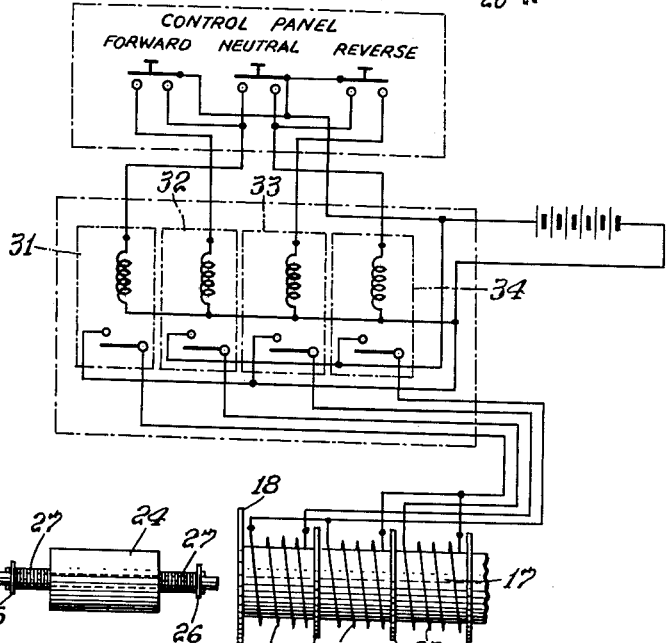

Our invention relates generally to remote controlled gear shifting devices and specifically to such a device for shifting gears on an outboard motor.

It is an object of our invention to provide a device which will shift gears on an outboard motor from a point remote from the location of the motor.

It is yet another object of our invention to provide a mechanical-electrical gear shift for an outboard motor.

It is a still further object of our invention to provide a simple, accurate, positive-acting, durable gear shift for an outboard motor.

Among the further objects and advantages of our invention is to provide a remote controlled gear shift that enables the operator to control the direction of travel from a point of maximum convenience.

These objects and advantages as well as other objects and advantages may be achieved by the device illustrated in the drawings in which:

FIGURE 1 is a side elevational view of a remote controlled gear shift illustrative of our invention;

FIGURE 2 is a view of the remote controlled gear shift with the housing removed; and FIGURE 3 is a view of one type of control circuit connected to the remote controlled gear shift.

Referring now to the drawings in detail, remote controlled gear shift is encased in a water-resistant housing 11 having a tubular central passage 31. The housing is provided with a cap 12, having a central aperture 32. A mounting bracket 13 is secured to the bottom of the housing 11. A cable 14, terminating in a terminal plug 15, engages with a connector 16 on the bottom of the housing 11.

Within the housing 11, a tubular sleeve 17 is positioned. This sleeve 17 has end flanges 18, 19. There are three intermediate flanges 20, etc., on the sleeve 17 between the end flanges 18, 19. The space between the end flange 18 and the first intermediate flange 20 is wound with several layers of wire 21 constituting a solenoid coil in order that it may set up a magnetic field when it is energized. The space between the first and second intermediate flanges 20, 20 is likewise wound with several windings of wire 22 constituting a second solenoid coil so that it may set up a second independent, successive magnetic field. The space between the third and fourth flanges 20, 20, is also wound with several layers of wire 23 constituting a third solenoid coil so that it may set up a third independent, successive magnetic field. The space between the third intermediate flange 20 and the end flange 19 is the area into which the ends of the windings 21, 22, 23 may be marshalled, led to, and connected with the connector 16. The tubular sleeve 17 is provided with a smooth inner bore in which a solenoid armature 24 is positioned to move slidably from one end of the sleeve to the other. The windings of wire 21, 22, 23 are substantially of the same length. The solenoid armature 24 is however longer than each of the wire windings 21, 22, 23, so that when it lies in the bore of the tubular sleeve 17, it will extend somewhat beyond each winding adjacent to it and into the area of the adjacent winding of wire. By this means, it is more easily magnetically attractable by an adjacent wire winding.

The solenoid armature 24 is provided with a longitudinal passage which slidably receives a connecting rod 25. On the connecting rod 25, and spaced away from either end of the armature 24, there are washers 26, 26 held by pins 33. These washers 26, 26 act as stops for a pair of springs 27, 27, one on each side of the solenoid armature 24 so that it may move with relatively little resistance deeper into the magnetic field before the rod 25 is moved. The connecting rod 25 is connected to a gear shift lever 28, which in turn is suitably connected to an outboard motor or similar device. The wire layers 21, 22, 23 may be Directly and separately energized to produce successive magnetic fields to attract the armature 24 to the three positions opposite the windings 21, 22, 23. These three positions correspond to the Forward, Neutral, and Reverse positions of the gear shift lever 28 and control the outboard motor.

The wire layers 21, 22, 23 may also be Indirectly, separately energized to attract the armature 24. A circuit for so doing is shown in FIGURE 3. Starting from neutral position, the Forward button is pressed. This energizes relays 31 and 32 and winding 23. Then the Neutral button is pressed which energizes relays 31 and 33. Winding 22 is then energized. When the Reverse button is pressed, relays 33 and 34 are energized; the circuits to winding 21 are closed and the related magnetic field attracts the armature 24 to bring the gear shift lever 28 to reverse position.

The length of the armature 24 which is greater than the length of any of the windings 21, 22, 23 insures the attraction of the armature 24 into the adjacent zone since it extends slightly into that zone and moves into that zone a further distance when the magnetic field overcomes the spring 27 although the inherent inertia of the lever 28 is not immediately overcome. However, should the Reverse button be pressed with the armature 24 in forward position, there is no response and damage to the motor is avoided by reason of the time lapse necessary to move the armature 24 core by steps from forward first to neutral, and then secondly to reverse.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

We claim:

1. A remote controlled gear shift comprising a plurality of coaxial coils immediately adjacent to each other and having a continuous uninterrupted passage therethrough, an armature slidably positioned in the passage, each coil being of substantially uniform length and the armature being longer than any one of the coils but shorter than two coils combined and having a uniform reluctance along its entire length, and switch means for separately energizing the solenoid coils.

2. A remote controlled gear shift in accordance with claim 1 in which the armature is provided with an axial passage and a connecting rod slidably positioned in the passage in the armature, a pair of springs carried by the connecting rod on either side of the armature each bearing on the armature in opposition to each other, and a gear shift lever operably connected to the connecting rod.

(References on following page)

References Cited in the file of this patent

UNITED STATES PATENTS

| | | |
|---|---|---|
| 1,253,207 | Brown | Jan. 15, 1918 |
| 1,720,989 | Ahlm | July 16, 1929 |
| 2,156,118 | Kliesroth | Apr. 25, 1939 |
| 2,256,929 | Sugarwater | Sept. 23, 1941 |
| 2,379,029 | Naud | June 26, 1945 |
| 2,617,311 | Miller | Nov. 11, 1952 |
| 2,665,593 | Williams et al. | Jan. 12, 1954 |

FOREIGN PATENTS

| | | |
|---|---|---|
| 591,040 | Great Britain | Aug. 5, 1947 |